No. 882,497.  
PATENTED MAR. 17, 1908.  
E. GUNNELL.  
HOSE COUPLING.  
APPLICATION FILED JAN. 24, 1906.
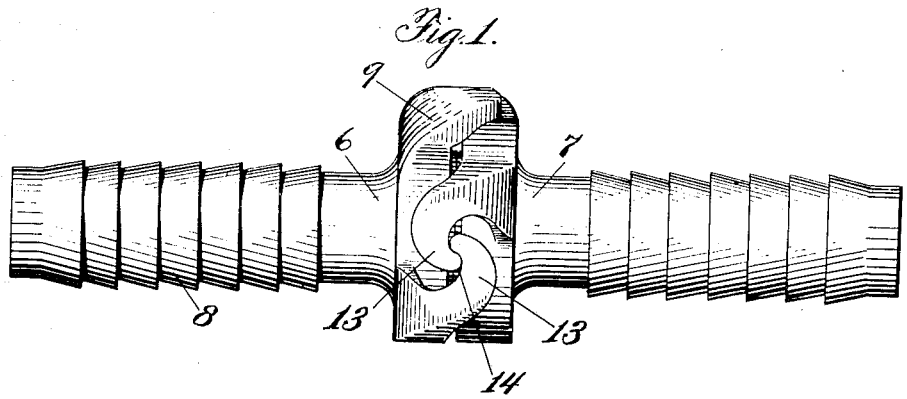
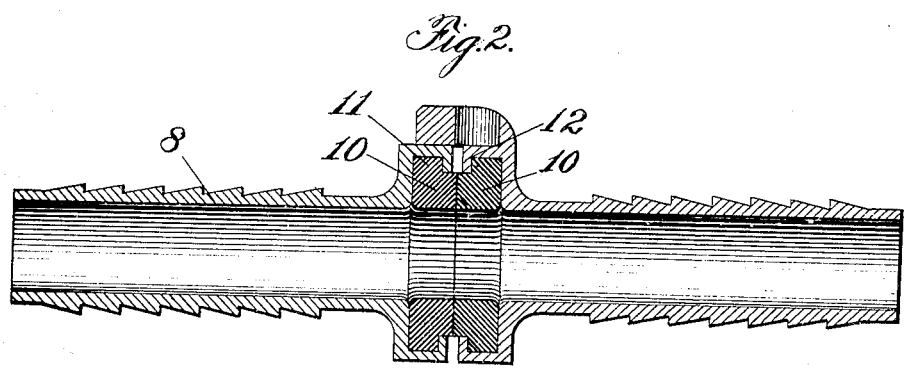
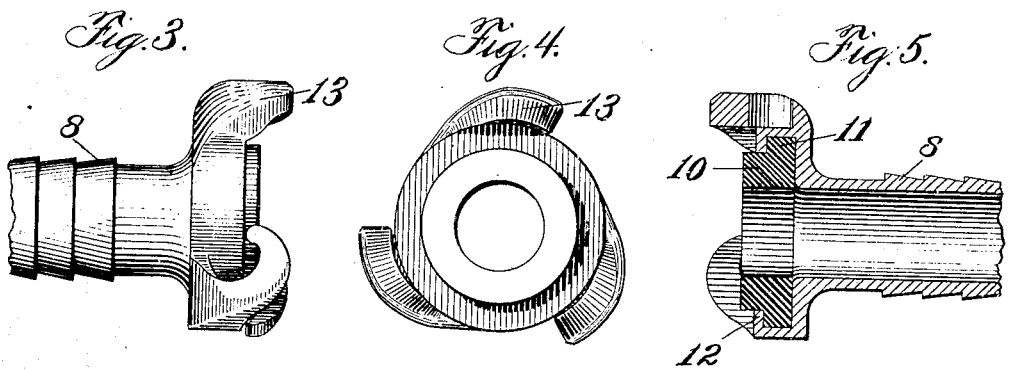
WITNESSES  
Harvey L. Lechner.  
J. C. Bradley.
INVENTOR  
Elias Gunnell  
by Synnestvedt & Carpenter  
Attys.

UNITED STATES PATENT OFFICE.

ELIAS GUNNELL, OF MANITOWOC, WISCONSIN.

HOSE-COUPLING.

No. 882,497.　　　Specification of Letters Patent.　　　Patented March 17, 1908.

Application filed January 24, 1906. Serial No. 297,616.

*To all whom it may concern:*

Be it known that I, ELIAS GUNNELL, a citizen of the United States, residing at Manitowoc, in the county of Manitowoc and State of Wisconsin, have invented certain new and useful Improvements in Hose-Couplings, of which the following is a specification.

My invention relates to means for detachably connecting sections of hose intended for the transmission of fluid under pressure, and its objects are; to provide a fluid-tight joint between said sections by means of a coupling composed of companion members of a similar construction, adapted to automatically interlock when in one position and to unlock and be readily taken apart when in the reverse position; to provide a coupling of an exceedingly simple and durable construction, free from complicated parts and one in which the gaskets are so constructed that they will act to hold the companion members securely locked together when brought into contact and will remain in the coupling members when separated, without the employment of additional mechanism. These objects, and other advantages which will hereinafter appear, I attain by means of the construction illustrated in the preferred form in the accompanying drawings, wherein—

Figure 1 is a side elevation of the two companion members locked together;

Figure 2 is a longitudinal section through the two members,

Figure 3 is a side elevation of the end of one of the members;

Figure 4 is an end view of the same, and

Figure 5 is a longitudinal section through the end of one of the sections.

The coupling may be made of any material suitable for the purpose, but is preferably made of a composition of aluminium, nickel, tin and copper, in the approximate proportions of—aluminium 87%, nickel 7%, tin 3½% and copper 2½%. This makes a light, durable and exceedingly strong coupling. As above stated, however, the coupling may be made of any suitable material, and is not restricted to the composition recited.

In the practice of my invention I provide a coupling of two companion members 6 and 7 of exactly similar construction, each of said members consisting primarily of a hollow shank 8 to which the hose is secured and a head portion 9 of greater diameter than the shank. Gaskets 10 are fitted in the heads 9 and are retained therein by means of an annular recess 11, formed in the head, said recess being adapted to receive and hold the shoulder 12 formed on the gasket. The gaskets are composed of an elastic material such as rubber, whereby they may be readily sprung into place in the recesses. The gaskets project beyond the heads to such an extent that it is necessary to subject them to considerable compression when making a coupling, the resultant expansive action serving to bring the faces of the gaskets into closer contact, thereby insuring a tight joint at the faces of the gaskets, and at the same time holding the companion members of the coupling firmly interlocked by means of the mechanism to be presently described. The coupling members are each provided with a plurality of interlocking hooks 13, (in the present instance three), which hooks 13 are adapted to engage in the manner indicated in Figure 1 and lock the two coupling members together. Each coupling member is provided with a recess 14 into which the point of the hooked member of the companion part is adapted to fit. When it is desired to secure the two members together the heads are placed so that the points of the hooks are adjacent and longitudinal pressure is exerted together with a twisting movement. The longitudinal pressure compresses the gaskets so that the points of the hooks are in position to pass, and the twisting movement brings such points into the position indicated in Figure 1. When it is desirable to uncouple the members the operation is reversed. It will be noted that the ends of the hooks are somewhat rounded and are adapted to constitute camming surfaces, whereby the longitudinal pressure necessary to get the hooked end in engagement is decreased, for the reason that when twisting force is exerted the cam surfaces engage and tend to move the members longitudinally. It will thus be seen that the coupling and uncoupling is facilitated, and that much less pressure longitudinally needs to be exerted in uncoupling or coupling. The size of the gaskets is such that when in locked position as in Figure 1 such gaskets are under compression. This presses the two members apart, causing a firm interlocking engagement between the two members. It will be of course apparent that a different number of hooked members 13 might be used. Three such members, however, are sufficient, and a greater number is unnecessary, and a less number, as two, while they might hold the coupling and make a tight joint, would not give the same secure joint and satisfactory result that three do.

Having thus described my invention and illustrated its use, what I claim as new and desire to secure by Letters Patent, is the following:

A hose coupling comprising a pair of co-operating members, each of which members comprises a shank, a head and a plurality of hooks thereon having rounded ends and provided with curved recesses, which recesses are adapted to receive the rounded ends of the hooks on the opposing member and are of such size as to receive the hooks loosely and permit of a relative rotary movement of the members after the hooks are seated in the recesses.

In testimony whereof I have hereunto signed my name in the presence of the two subscribed witnesses.

ELIAS GUNNELL.

Witnesses:
 PAUL CARPENTER,
 ALBERT G. MILLER.